United States Patent
Dwork et al.

(10) Patent No.: US 7,698,250 B2
(45) Date of Patent: Apr. 13, 2010

(54) DIFFERENTIAL DATA PRIVACY

(75) Inventors: Cynthia Dwork, San Francisco, CA (US); Frank D. McSherry, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 320 days.

(21) Appl. No.: 11/305,800

(22) Filed: Dec. 16, 2005

(65) Prior Publication Data

US 2007/0143289 A1  Jun. 21, 2007

(51) Int. Cl.
G06F 7/00 (2006.01)

(52) U.S. Cl. ............................................ 707/2; 702/180
(58) Field of Classification Search ................. None
See application file for complete search history.

(56) References Cited

U.S. PATENT DOCUMENTS

| 6,253,203 | B1 * | 6/2001 | O'Flaherty et al. ........... 707/9 |
| 2002/0157020 | A1 * | 10/2002 | Royer ........................ 713/201 |
| 2005/0021488 | A1 * | 1/2005 | Agrawal et al. ................. 707/1 |

OTHER PUBLICATIONS

Cynthia Dwork and Kobbi Nissim, "Privacy-Preserving Datamining on Vertically Partitioned Databases", Published Jun. 30, 2004 Microsoft Research, pp. 1-17.*
Dwork et al., (Privacy-Preserving Datamining on Vertically Partitioned Databases), Published Jun. 30, 2004 Microsoft Research, pp. 1-17.*
Dwork et al. (Privacy-Preserving Datamining on Vertically Partitioned Databases; pp. 1-17).*
Cynthia Dwork and Kobbi Nissim, Privacy-Preserving Datamining on Vertically Partitioned Databases, 2004, Microsoft Research.*
U.S. Appl. No. 11/244,800, filed Oct. 6, 2005, Dwork et al.
U.S. Appl. No. 11/291,131, filed Nov. 30, 2005, Dwork et al.
U.S. Appl. No. 11/292,884, filed Dec. 2, 2005, Dwork et al.
U.S. Appl. No. 11/298,563, filed Dec. 9, 2005, Dwork et al.
U.S. Appl. No. 11/316,761, filed Dec. 22, 2005, Dwork et al.
Ben-Or, M., et al., "Completeness theorems for non-cryptographic fault-tolerant distributed computation," *ACM*, 1988, 1-10.
Blum, A., et al., "Practical privacy: The SuLQ framework," *PODS*, 2005, 128-138.

(Continued)

*Primary Examiner*—Pierre M Vital
*Assistant Examiner*—Truong V Vo
(74) *Attorney, Agent, or Firm*—Woodcock Washburn LLP

(57) ABSTRACT

Systems and methods are provided for controlling privacy loss associated with database participation. In general, privacy loss can be evaluated based on information available to a hypothetical adversary with access to a database under two scenarios: a first scenario in which the database does not contain data about a particular privacy principal, and a second scenario in which the database does contain data about the privacy principal. Such evaluation can be made for example by a mechanism for determining sensitivity of at least one database query output to addition to the database of data associated with a privacy principal. An appropriate noise distribution can be calculated based on the sensitivity measurement and optionally a privacy parameter. A noise value is selected from the distribution and added to query outputs.

18 Claims, 6 Drawing Sheets

OTHER PUBLICATIONS

Chawla, S., et al., "On the utility of privacy-preserving histograms," *UAI*, 2005, 120-127.

Chawla, S., et al., "Toward privacy in public databases," *Theory of Cryptography Conference*, 2005, 363-385.

Dwork, et al., "Privacy-preserving datamining in vertically partitioned databases," *Crypto*, 2004, 17 pages.

Goldreich, O., et al., "How to play any mental game," *ACM*, 1987, 218-229.

Killian, J., "Secure Computation,"*Cryptography Tutorial*, http://www.cs.rutgers.edu/~jkilian/lectures, downloaded from the Internet on Feb. 27, 2006.

* cited by examiner

Exponential Distribution

Normal Distribution

Hybrid Distribution

US 7,698,250 B2

DIFFERENTIAL DATA PRIVACY

BACKGROUND

Data collection is used to gather information for a wide variety of academic, business, and government purposes. For example, data collection is necessary for sociological studies, market research, and in the census. To maximize the utility of collected data, all data can be amassed and made available for analysis without any privacy controls. Of course, most people and organizations ("privacy principals") are unwilling to disclose all data, especially in modern times when data is easily exchanged and could fall into the wrong hands. Privacy guarantees can improve the willingness of privacy principals to contribute their data, as well as reduce fraud, identity theft, extortion, and other problems that can arise from sharing data without adequate privacy protection.

A method for preserving privacy is to compute collective results of queries performed over collected data, and disclose such collective results without disclosing the inputs of the participating privacy principals. For example, a medical database might be queried to determine how many people in the database are HIV positive. The total number of people that are HIV positive can be disclosed without disclosing the names of the individuals that are HIV positive. Useful data is thus extracted while ostensibly preserving the privacy of the principals to some extent.

However, as one might imagine, clever adversaries might apply a variety of techniques to predict or narrow down the set of individuals from the medical database who are likely to be HIV positive. For example, an adversary might run another query that asks how many people both have HIV and are not named John Smith. The adversary may then subtract the second query output from the first, and thereby learn the HIV status of John Smith without ever directly asking the database for a name of a privacy principal. With sensitive data, it is useful to provide verifiable privacy guarantees. For example, it would be useful to verifiably guarantee that nothing more can be gleaned about any specific privacy principal than was known at the outset.

Adding noise to a query output can enhance the privacy of the principals. Using the example above, some random number might be added to the disclosed number of HIV positive principals. The noise will decrease the accuracy of the disclosed output, but the corresponding gain in privacy may warrant this loss. The concept of adding noise to a query result to preserve the privacy of the principals is discussed in U.S. patent application Ser. No. 11/244,800, filed Oct. 6, 2005; U.S. patent application Ser. No. 11/298,563, filed Dec. 9, 2005; U.S. patent application Ser. No. 11/292,884, filed Dec, 2, 2005; U.S. patent application Ser. No. 11/316,791 filed Dec. 22, 2005; U.S. Patent application Ser. No. 11/291,131, filed Nov. 30, 2005; and U.S. patent application Ser. No. 11/316,761. Some additional work on privacy includes Chawla, Dwork, McSherry, Smith, and Wee, "Toward Privacy in Public Databases," Theory of Cryptography Conference, 2005; Dwork, Nissim, "Privacy-Preserving Data Mining in Vertically Partitioned Databases," Crypto 2004; Blum, Dwork, McSherry, Nissim, "Practical Privacy: The SuLQ Framework," PODS 2005; and Chawla, Dwork, McSherry, Talwar, "On the Utility of Privacy-Preserving Histograms," UAI 2005.

Even when noise is added to results, adversaries may be able to glean information about privacy principals by running a multitude of queries and comparing the outputs. This problem can be addressed by requiring that each of at most T queries of the data be a simple summation of the result of applying a fixed function to the data pertaining to each privacy principal, and queries beyond the $T^{th}$ are not answered.

In addition to the above, so-called secure function evaluation techniques, developed in the 1980's, were a major advance in the ability of people, organizations, or other entities ("privacy principals") to compute a collective result without disclosing their individual data to one another. Secure function evaluation is explored in a variety of academic publications. For a background discussion of secure function evaluation, please refer to Ben-Or, Goldwasser, and Wigderson, "Completeness Theorems for Non-Cryptographic Fault-Tolerant Distributed Computation" (1988), and/or Goldreich, Micali, and Wigderson, "How to Play Any Mental Game" (1987).

SUMMARY

The present invention provides systems and methods for controlling privacy loss associated with database participation. In general, privacy loss can be evaluated based on comparing information available to a hypothetical adversary with access to a database under two scenarios: a first scenario in which a database does not contain data about a particular privacy principal, and a second scenario in which a database does contain data about the privacy principal. Such evaluation can be made for example by a mechanism for determining sensitivity of at least one database query output to addition to the database of data associated with a privacy principal. An appropriate noise distribution can be calculated based on the sensitivity measurement and optionally a privacy parameter. In one embodiment, the privacy parameter can be selected by a privacy principal, for example through an interface for accepting at least one privacy parameter from at least one privacy principal. A noise value is selected from the distribution and added to query outputs.

BRIEF DESCRIPTION OF THE DRAWINGS

The systems and methods for preserving privacy in accordance with the present invention are further described with reference to the accompanying drawings in which.

DETAILED DESCRIPTION

Figure 1:
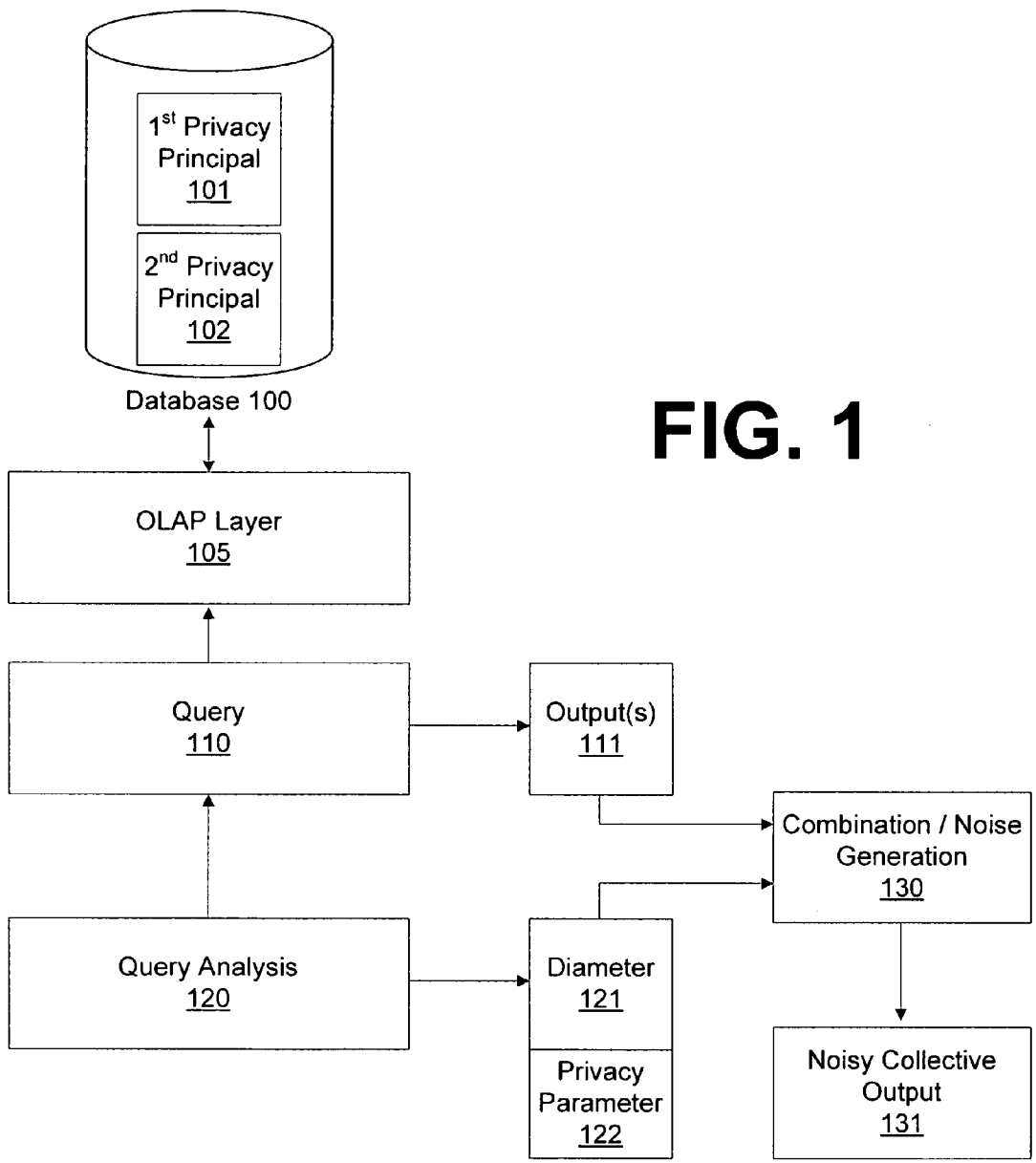
FIG. 1 illustrates a system for generating a noisy collective output 131, wherein said system preserves privacy of data used in calculating said noisy collective output.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Overview

It is possible to make strong privacy guarantees for an individual, effectively protecting individuals against an adversary gaining any advantage in knowing any predicate of that individual. However, to get these strong bounds there are explicitly stated assumptions that the adversary knows any correlations between the target and other database participants. To ensure privacy against all adversaries in the presence of correlated database rows, current techniques require the amount of noise to be very large indeed, rendering the output all but useless. A formal approach is needed for guaranteeing privacy when database rows (information pertaining to different principals) are not mutually independent.

Thus, one way to bound privacy loss is by comparing the adversary's knowledge about an individual in two cases: (1) with no access to the database and (2) after interaction with the database. In contrast, in the approach described herein, we bound privacy loss by comparing the adversary's knowledge about an individual in the cases (1') given access to the database NOT containing the individual and (2') given access to the database with the individual present in the database. A comparison of (1) and (1'), above, shows they are quite different. While (1) considers an adversary without access to a database, (1') considers an adversary with access to a database, only the database does not contain a privacy principal in question.

We describe herein a new policy for output perturbation, i.e. adding noise to a database query output, which gives a more realistic privacy guarantee while reducing the amount of noise that is used. Rather than attempt to prevent an adversary from learning anything at all about a person, organization or other privacy principal, we prevent the adversary from learning any more than it would have, had the privacy principal not participated in the query. For this reason, we call this notion "differential privacy": it measures the added risk a privacy principal incurs by joining a database. Alternatively, it measures the change in the privacy that a privacy principal enjoys.

Moreover, techniques described herein prevent individuals from compromising the privacy of others. A database participant can not, through malice or ignorance, compromise another's information. Finally, by ensuring that participants lose nothing, or an acceptably small amount, by joining a database, we also ensure that at no point is there anything significant to gain by departing from the database.

In our perturbation, we can select noise values from a noise distribution. The noise distribution can be, for example, exponentially distributed noise, whose density function resembles:

$$p(x) \sim \exp(-\|x\|/R)$$

where R is a parameter controlling the variance of the random variable.

The noise determination process can be accomplished, in general, as described in U.S. patent application Ser. No. 11/291,131, filed Nov. 30, 2005, referred to herein as the "Diameter" patent, and incorporated by reference in its entirety. To choose R, we use a concept of differential diameter, which is related to the diameter concept introduced in the Diameter patent. Differential diameter is measured with respect to the presence/absence of an individual privacy principal: how much can the output of a query function f of the database change with the addition/deletion of an individual privacy principal? The mathematical definition of an L1 norm is the sum of absolute values of entries in a vector of values. For a vector x of n coordinates x1, x2, x3, ... xn, the L1 norm $\|x\|=\sum_{1 \le I \le n} |xi|$. Here, the change in the output of a function is the L1 norm of the difference, e.g., $$\|f(DB)-f(DB \text{ without the privacy principal})\|\_1$$

In addition, R is also a function of the maximum allowable privacy loss.

Calculating Noise using a Differential Diameter, a Privacy Parameter, and a Distribution Function Differential privacy is accomplished by adding noise values to database query outputs. The noise values are selected from a noise distribution, and the noise distribution may be calculated using a differential diameter measurement, a privacy parameter and a distribution function.

In measuring a differential diameter, we look at two versions of a database: one with a given tuple and the other without the tuple. Thus differential diameter may be distinguished from the diameter measurement introduced in the Diameter patent, which looks at the possibility of having a different value for the tuple. That is, the distinction is between changing a tuple and adding or deleting a tuple.

In many situations, it is much easier to give guarantees about the change in privacy levels with respect to an individual's decision to participate in the database/query. To determine how large an impact such a change would have, we measure the differential diameter under this change: we measure how much the data can change when the privacy principal joins or leaves a database.

Differential diameter may be viewed as a subset of diameter more generally, because diameter measurements can exist outside the methodology of differential privacy, for example as explained in the Diameter patent. Specifically, the Diameter patent gives guarantees that are suitable only when one is willing to assume that the adversaries who are attempting to violate privacy are well informed and rational. Differential privacy gets around this, by making a crisp statement that no matter the nature of the adversary, their conclusions are not substantially different in the cases where a participant is present or absent.

Thus, differential privacy describes a new privacy quantity suitable for measure, and the diameter work describes a new way to measure privacy quantities. Either can be used by themselves, or the two may be used in concert.

A privacy parameter, referred to herein as epsilon, may be used to increase or decrease the amount of privacy that is ensured. When epsilon is used to widen the distribution of possible noise values, it enhances privacy beyond the amount that would be ensured by using differential diameter alone in a particular distribution equation. Conversely, if epsilon is used to narrow the distribution, it decreases privacy from what would be obtained using differential diameter alone. Thus, epsilon values can represent an amount of enhanced privacy, or, stated another way, epsilon can be a measure of privacy loss. The extent to which epsilon impacts privacy can be tailored by the distribution equation that is selected.

Figure 2A:
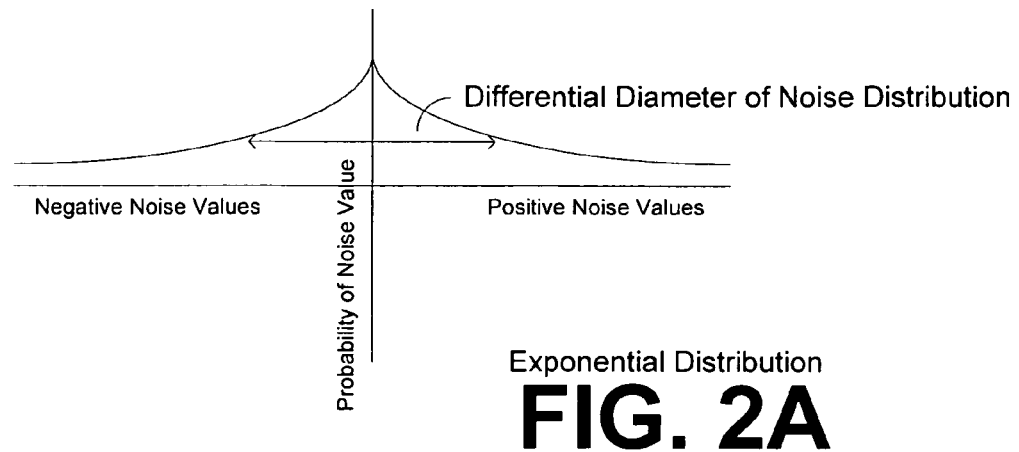
FIG. 2A illustrates an exponential distribution of possible noise values to add to a collective output.
Figure 2B:
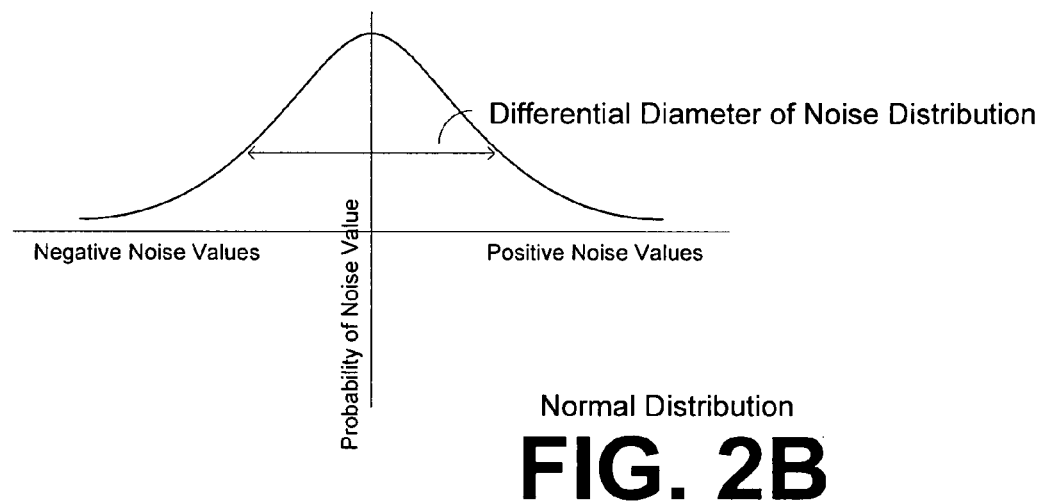
FIG. 2B illustrates a normal distribution of possible noise values to add to a collective output.

Knowing the differential diameter of a function f with respect to a privacy principal p, and having chosen a privacy parameter corresponding to an acceptable level of privacy loss, we can ensure a certain degree of privacy simply by choosing to add a noise value selected from a noise distribution to the answer f(x) before returning it. The noise distribution function is a function that in this case uses differential diameter and epsilon to generate a distribution such as the exemplary distributions provided in FIG. 2A-2C. Two examples of noise distribution functions include:

noise~exp(-\epsilon||x||/diffdiam1(f,p))//"exponential" noise—see FIG. 2A.

noise~exp(-\epsilon||x||^2/diffdiam2(f,p))//"normal" noise—see FIG. 2B.

Here \epsilon is a privacy parameter that determines an amount of privacy that is ensured, and diffdiam is a differential diameter measurement as explained above. Note that in this embodiment, an epsilon of zero will correspond to zero privacy loss, but will also render the database useless because the amount of added noise becomes infinite.

FIG. 1 presents a system for generating a noisy collective output 131, wherein said system preserves privacy of data used in calculating said noisy collective output 131. A database 100 is configured to store data associated with a plurality of privacy principals 101, 102 and configured with a query mechanism 110 to run queries on said data to obtain a plurality of outputs 111. The database 100 may be configured with an Online Analytical Processing (OLAP) Layer 105. Outputs 111 can be combined to produce a collective output. In FIG. 1, output 111 combination could occur, for example, in a noise generation mechanism 130 that both combines outputs 111 and calculates an amount of noise to add to the combined outputs, then reveals a noisy collective output 131.

A database 100 is a collection of data, typically describing the activities of one or more related organizations, people, or other entities referred to herein as privacy principals. For example, a university database might contain information about entities, such as students, faculty, courses, and classrooms, and relationships between entities, such as student enrollment in courses, faculty teaching courses, and the use of rooms for courses. A database management system, or DBMS, is software designed to assist in maintaining and utilizing large collections of data. For the purpose of this document, however, the term "database," or "database server" refers to either or both of a collection of data and DBMS software. Thus, database 100 illustrates a database server comprising both collections of data and DBMS. Note that as such database 100 may include the various other elements presented in FIG. 1 which are illustrated separately to clearly suggest the operation of the invention.

Various DBMS products, e.g. MICROSOFT SQL SERVER®, IBM DB2®, ORACLE DATABASE®, and SYBASE IQ® have greatly extended the capabilities of databases. Databases can store a wide variety of data types, such as images and text, and can perform complex queries on stored data. Specialized systems have been developed by numerous vendors for creating data warehouses, consolidating data from several databases, and for carrying out specialized analysis. All such products and database configurations are suitable for use in connection with the systems and methods herein.

Query mechanism 110 can perform any desired queries over data in databases. Queries can be simple or complex, and can generate single outputs or multiple outputs. Also, a privacy principal can be any defined entity or group of entities.

A query analysis mechanism 120 determines a differential diameter 121 for a particular query. A query need not actually be run against the data in database 100 in order to analyze the query. Query analysis can proceed by determining first information that would be available to an adversary with access to a database query output, said database not containing data associated with the privacy principal, and determining second information that would be available to said adversary with access to a second database query output, said second database containing data associated with the privacy principal.

The query analysis mechanism 120 may also be referred to as a mechanism for determining sensitivity of at least one database query output to addition to the database of data associated with a privacy principal. The sensitivity that we measure is the maximum change, ideally over all possible databases, of how the value of the function would change were any element removed from the databases. This is not in general something that can be determined by exhaustive search, as it would take too long. However, in some cases it is very easy to determine the answer, because of the structure of the function. It may not be obvious, and therefore in some embodiments a user may present a function together with a purported proof of the sensitivity of the function, and the mechanism 120 would check the proof.

The system of FIG. 1 further comprises a noise generation mechanism 130. This mechanism may include a variety of functions, which may be outsourced to individual components or conducted by 130 as shown. Noise generation mechanism 130 calculates, using said differential diameter 121, a distribution of possible noise values to add to a collective output. The equations illustrated above provide exemplary approaches to calculating noise distributions. Exemplary noise distributions are further illustrated in FIG. 2A-2C.

Figure 2C:
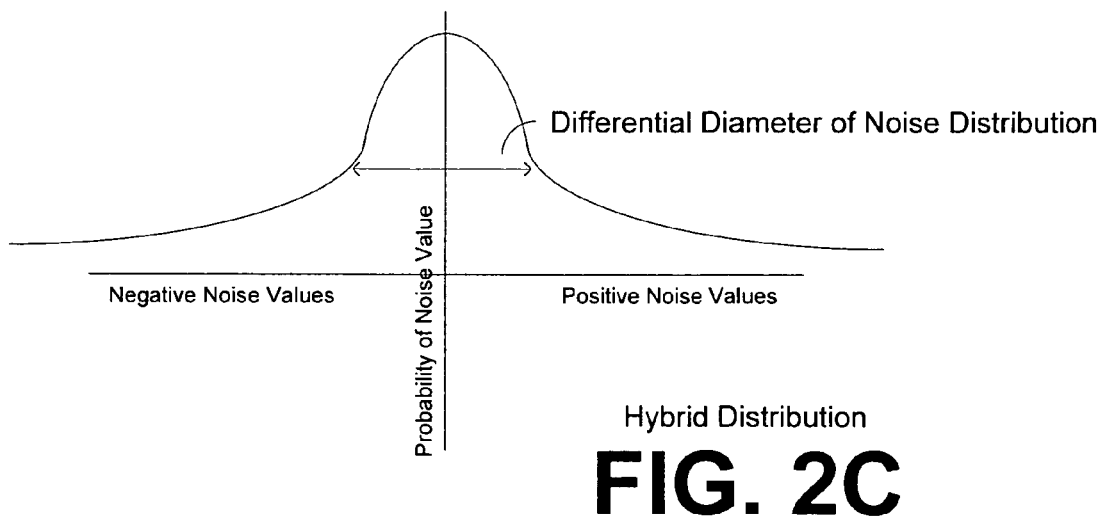
FIG. 2C illustrates a hybrid distribution of possible noise values to add to a collective output.

FIG. 2A-2C depict noise values along an x-axis, and probabilities associated with such noise values on the y-axis. Thus, a noise value on the x-axis corresponding to a high value on the y-axis has a high probability of being selected. The illustrated distributions all share a beneficial feature of decreasing the probability a given noise value as its absolute value increases. This allows noisy outputs to nonetheless be useful, because the probability of an excessively high noise value can be remote.

FIG. 2A illustrates an exponential distribution, as will be recognized by those of skill in mathematics. FIG. 2B illustrates a normal distribution. FIG. 2C represents a hybrid distribution. The hybrid distribution of FIG. 2C is a normal and exponential distribution, such that a normal distribution defines a portion of the distribution comprising the most probable noise values, i.e. those with a higher y-axis value, and an exponential distribution defines a portion of the distribution comprising the least probable noise values, i.e. those with low y-axis values, corresponding to larger absolute values on the x-axis.

A differential diameter and privacy parameter can be used in calculating each of the distributions in FIG. 2A-2C. A large differential diameter value will widen the distribution, increasing the probability that larger x-axis (noise) values will be used. Conversely, a small differential diameter will decrease the likelihood of large noise values. Where the privacy parameter is in the denominator of the distribution function as with the representative functions herein, small epsilons will correspond to strong privacy and vice versa. The exemplary equations provided above are satisfactory, and those of skill in the art will be able to construct an infinite variety of distributions that successfully utilize a differential diameter measurement and privacy parameter to create a satisfactory noise distribution. For example, an infinite number of small modifications to the distributions depicted in FIG. 2A-2C are possible.

A system such as that illustrated in FIG. 1 can be used to protect the privacy of any types of data. For example, the data may be medical information, and the privacy principals may be people. The data may also comprise information submitted to a government agency, such as the Internal Revenue Service (IRS), wherein the privacy principals could be private individuals, companies, and/or other organizations.

To further demonstrate the usefulness of this approach to noise distribution, a few examples of applications that were not possible in the previous frameworks may be instructive. Adding noise to collective outputs in the two examples below was not previously possible either because the queries could not be represented as summations, or because adding noise that depends only on a number of queries rendered the data useless.

First, so-called k-Means is a popular data analysis algorithm, that operates by iteratively asking a collection of data points for their averages under various partitions. Importantly, each point participates in at most one of the parts at a time, and as a consequence the number of parts does not enter into the amount of noise added. A system such as FIG. 1 can significantly improve the quality of the results given back, as the magnitude of noise is so much smaller.

Second, there are many situations where a firm may be interested in determining if they have the resources (staff, equipment, etc) to carry out a certain number of contracts, or more generally to determine the largest number of contracts they could fulfill with their current resources. In many cases it is important that their decision not leak information about their resources, either from the point of view of competitive advantage, or owing to privacy legislation. In either case, resource allocation commonly has the low diameter property: the presence or absence of a single employee is unlikely to change the total number of satisfiable contracts by more than a small amount. A single person can only do so much, and their absence only precludes those few things that they would otherwise have done. As such, this function can be computed and released noisily, ensuring the confidentiality of the particular resources that the firm has, while disclosing their capability of fulfilling the contracts. Importantly, it is unclear how this question could have been expressed in terms of a summation, and the more flexible diameter based perturbation allows computation that would not have been possible before.

Figure 3:
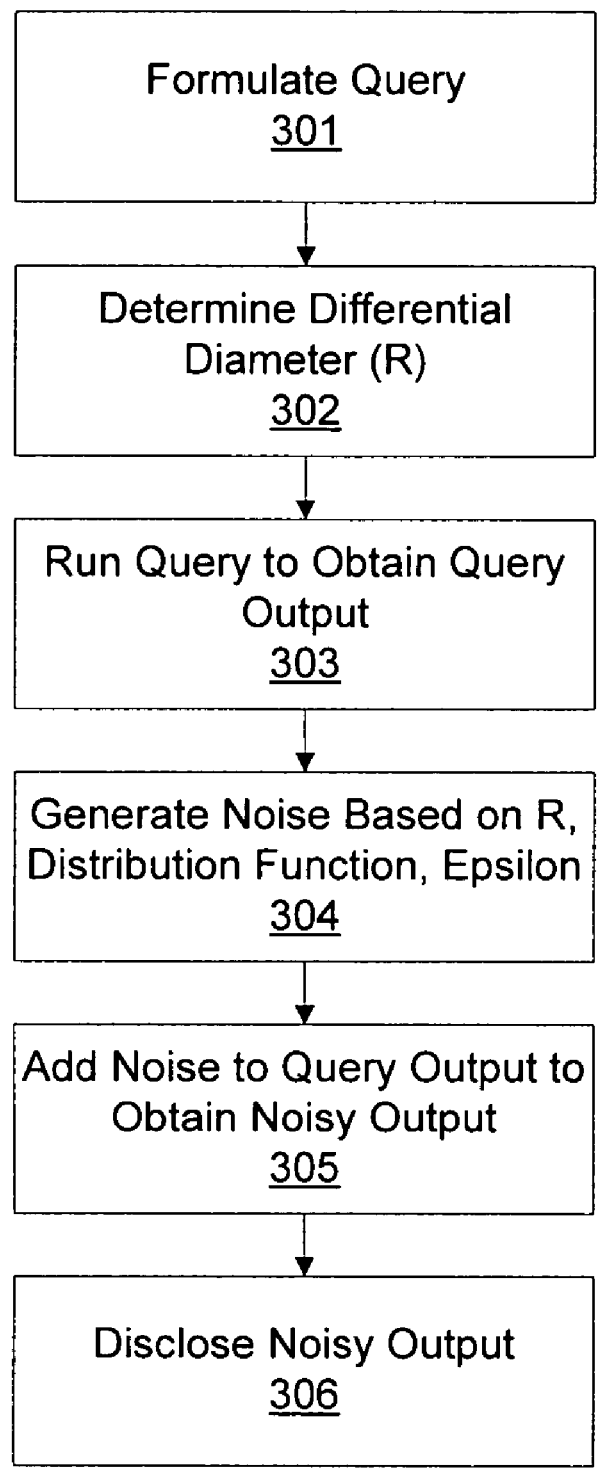
FIG. 3 illustrates a method for preserving privacy of data used in calculating an output.

With reference to FIG. 3, a method for preserving privacy of data used in calculating an output is illustrated. The method comprises first formulating whatever query is to be run against data in a database 301. Next, the query can be evaluated to determine a differential diameter (represented by the letter R) 302. The query can be performed on data associated with a plurality of privacy principals to obtain a plurality of outputs, and said plurality of outputs can be combined to produce a collective output.

The query can be run in step 303, or this step may be postponed until after calculating an appropriate noise distribution in step 304. Calculating an appropriate noise distribution 304 comprises calculating using said differential diameter (maximum difference) a distribution of possible noise values to add to said collective output. The calculation may also make use of a privacy parameter that corresponds to an amount of privacy that is ensured. The calculation may contemplate any type of distribution curves, for example the exponential distribution in FIG. 2A, the normal distribution in FIG. 2B, or a hybrid distribution such as that of FIG. 2C.

Once a query is performed on said data associated with a plurality of privacy principals, the collective output from the query can be calculated, and a noise value from the calculated distribution can be added to the collective output to produce a noisy collective output 305. finally, the collective noisy output can be disclosed 306, as can the noise distribution.

One interesting aspect of the invention is that it permits a useful backwards operation in which, for a given differential diameter and a known noise distribution, the value of the privacy parameter epsilon can be determined. Thus, systems using the invention that disclose a query and a noise distribution also verifiably disclose the value of the privacy parameter that was used. Privacy principals can thus be informed or calculate for themselves the degree of privacy that is being used with their data.

Figure 4:
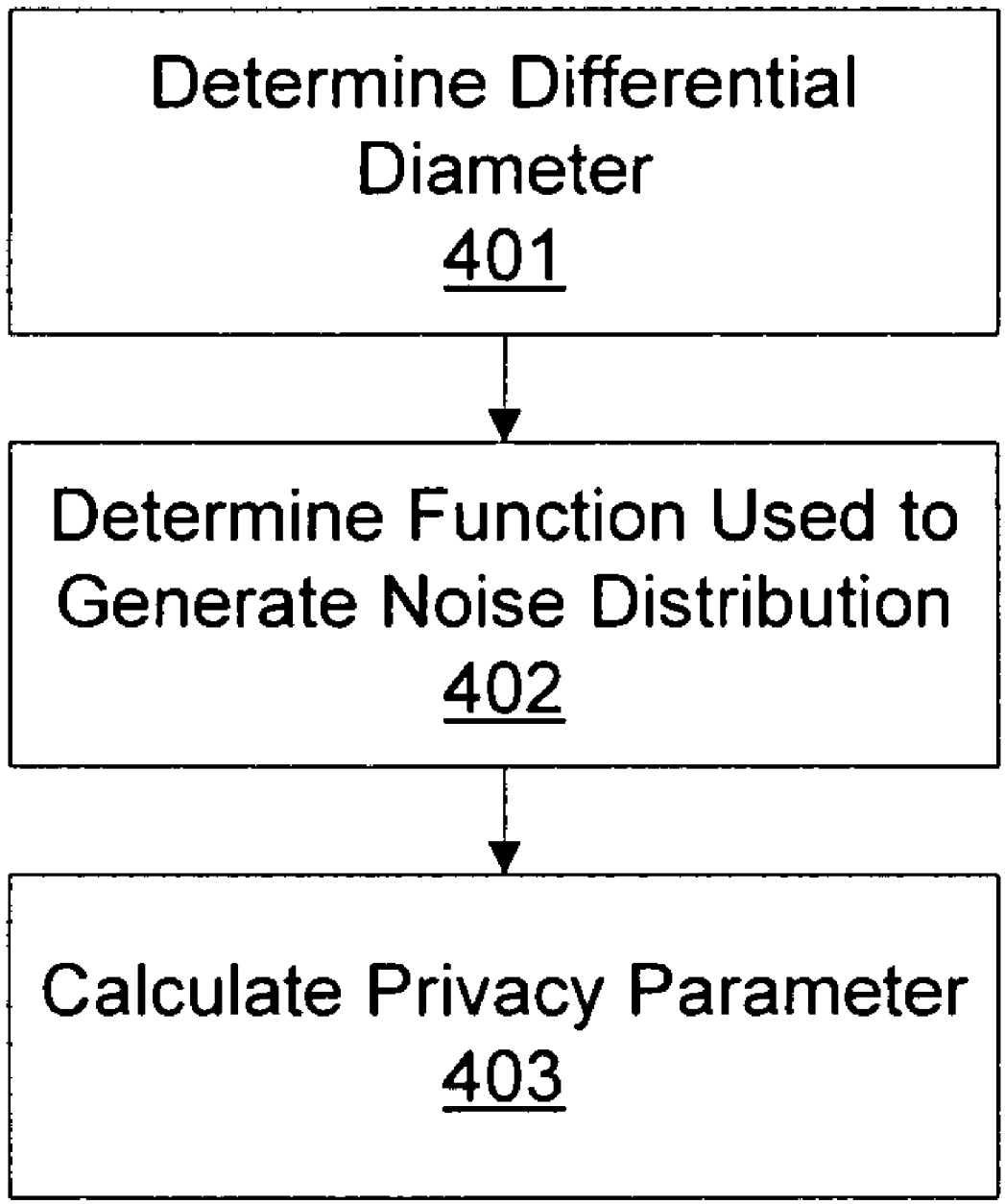
FIG. 4 illustrates a method for determining an amount of privacy guaranteed to privacy principals supplying data, wherein said data is used in calculating a collective noisy output.

A privacy principal that wished to calculate the privacy parameter that is being used with her data might carry out a method such as that illustrated in FIG. 4. Such a method is for determining an amount of privacy guaranteed to privacy principals supplying data, wherein said data is used in calculating a collective noisy output. The method comprises determining a differential diameter 401.

Next, determine the distribution function that was used to generate a noise distribution 402. In the examples provided herein the distribution function has two variables: differential diameter and epsilon, i.e. a privacy parameter corresponding to an amount of guaranteed privacy. If the distribution function and the differential diameter are known, epsilon can be calculated 403.

Exemplary Method for Controlling Privacy Loss

Figure 5:
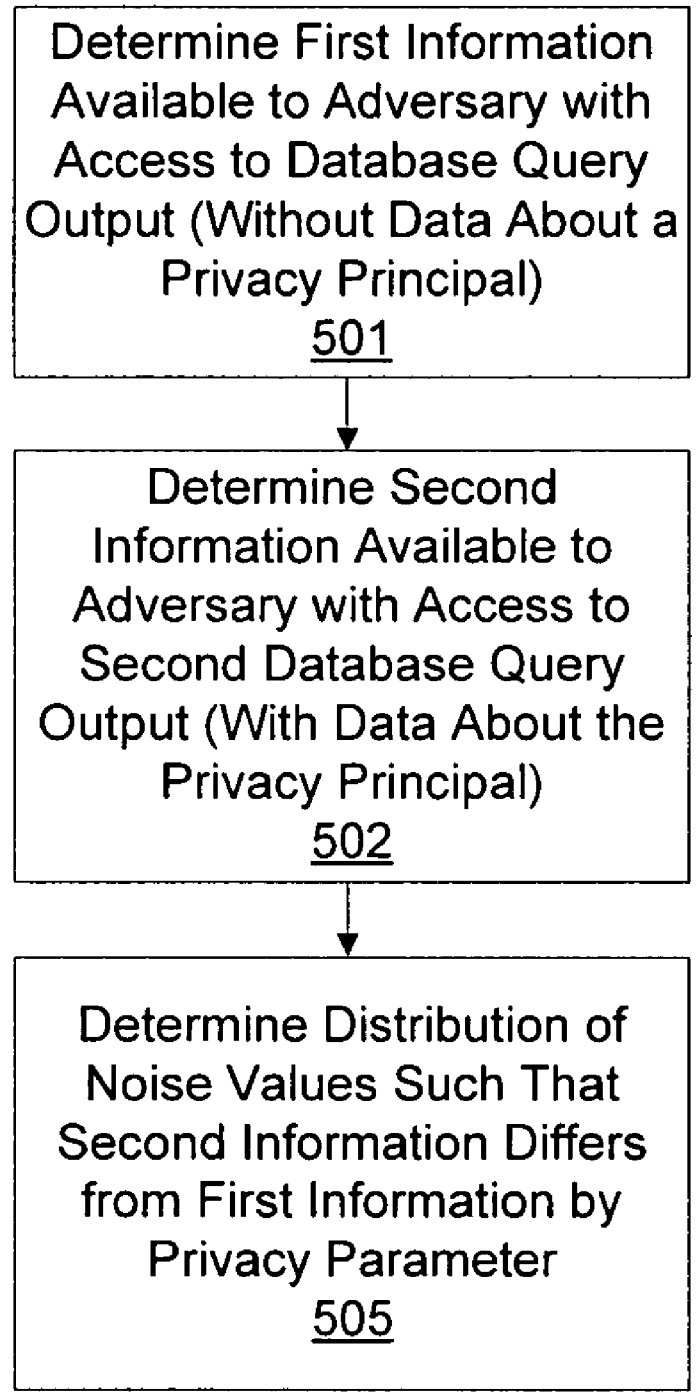
FIG. 5 illustrates an exemplary method for controlling privacy loss of a privacy principal.

FIG. 5 illustrates an exemplary method for controlling privacy loss of a privacy principal. The method can comprise determining first information that would be available to an adversary with access to a database query output 501. In this step, the hypothetical database does not contain data associated with the privacy principal. For example, an exemplary database might have data corresponding to individual human privacy principals. For each person, data may present indicating whether the person has ever regularly smoked cigarettes, and whether the person has ever been diagnosed with lung cancer.

The first information available to an adversary with access to a database query output in this setting could be an output that gives the number of people who smoke and also have lung cancer. The adversary can thus deduce the likelihood that smoking may lead to lung cancer. Let us presume for this discussion that among those who smoke there is a 30% chance of developing lung cancer. With this first information, if the adversary sees a privacy principal, e.g. a coworker, smoking, he may presume with some accuracy that there is a 30% chance the coworker has had or will develop lung cancer.

The method of FIG. 5 next contemplates determining second information that would be available to said adversary with access to a second database query output, said second database containing data associated with the privacy principal 502. Here, for example, the coworker's data is included in the database. In this particular database, particularly if the dataset is large, the difference between the first information and the second information may be minimal. In other words, regardless of whether the coworker joins the database, the adversary with access to the query output may learn that smoking correlates to a 30% chance of developing lung cancer, and therefore the adversary's knowledge of the coworker is unaffected by whether the coworker participates in the database.

Of course, not all datasets are large, and not all queries will be unaffected by the participation of a particular principal. Consider for example if the above database were small, and the coworker both smokes and has lung cancer. In this situation, the database query output may be highly sensitive to addition of the coworker's data to the database. That is, if the coworker does not contribute data, the adversary might have little to no information about the likelihood that the coworker has lung cancer. If the coworker does contribute data, on the other hand, the adversary might deduce from an unusually high number of smokers with lung cancer that it is extremely likely the coworker has cancer.

An aspect of the invention allows an administrator, privacy principal, or group of privacy principals to select a privacy parameter that can effectively tailor the amount of privacy loss associated with participation in the database. Thus, step 503 comprises determining a distribution of noise values to combine with a database query output such that the second information differs from the first information by an amount associated with a privacy parameter. For example, in the situation with very few database participants, a distribution that gives a wider range of likely noise values may be used to reduce privacy loss. As described above, a noise value is selected from the distribution and added to the actual query output when the query is run.

In one embodiment, the privacy parameter is chosen by the privacy principal. For example, if a person is being requested to participate in a database, an interface may be presented to the user that allows him or her to select an acceptable amount of privacy loss under the circumstances. If multiple principals are allowed to select a privacy parameter, a privacy parameter can be chosen from the plurality of parameters that is associated with a minimum amount of privacy loss. Embodiments may alternatively advertise the privacy parameter that is used, and the corresponding amount of privacy loss. This prevents the rogue participant who is unwilling to participate unless an unreasonably restrictive privacy parameter is used.

Exemplary System for Interactively Controlling Privacy Loss

Figure 6:
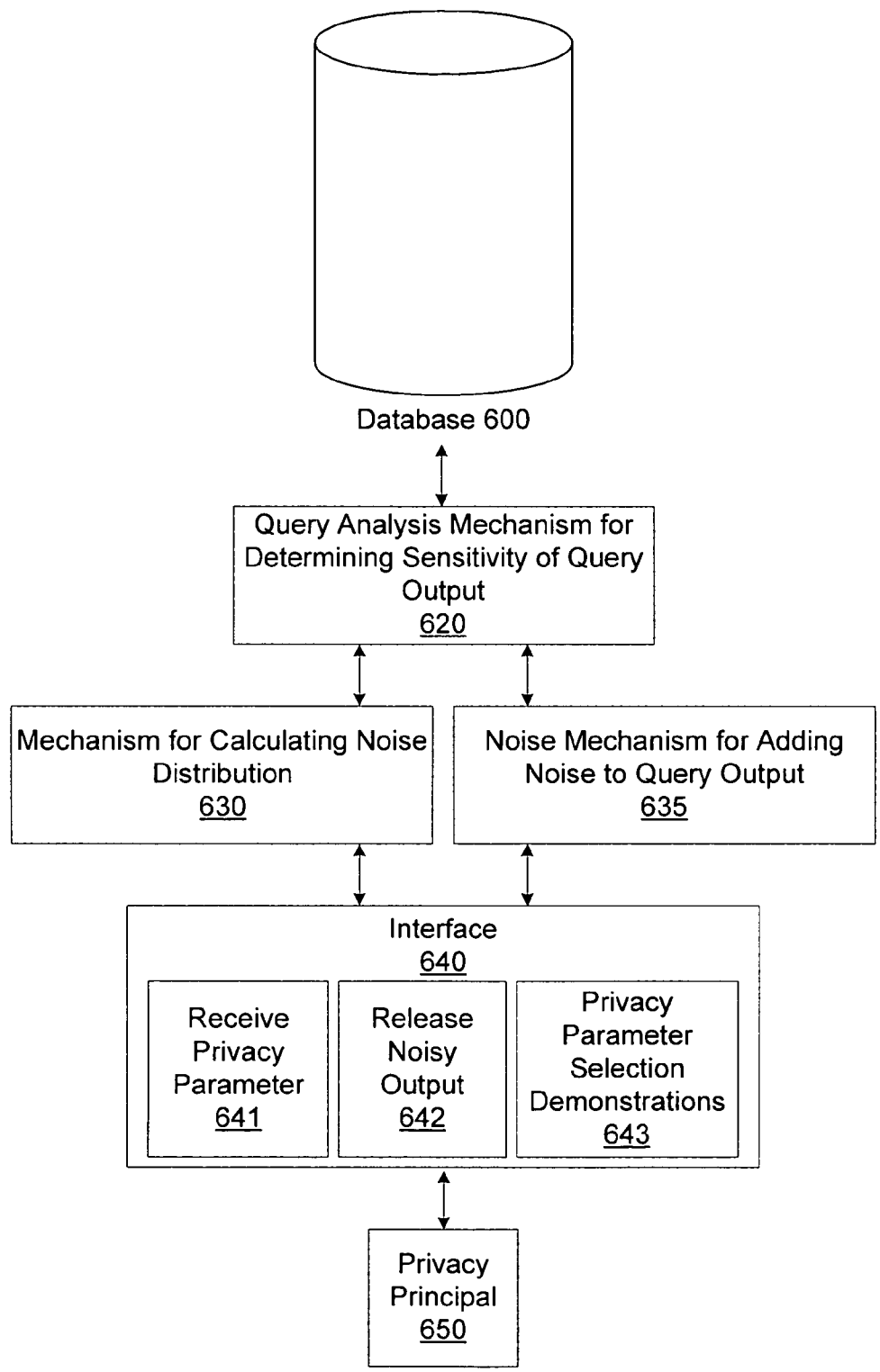
FIG. 6 illustrates a system for interactively controlling privacy loss.

FIG. 6 illustrates a system for interactively controlling privacy loss. In general, a privacy principal 650 can interact with a system comprising a database 600 through an interface 640. The privacy principal may select an acceptable privacy parameter and upload their private data to database 100, with the understanding that query outputs will add sufficient noise to preserve privacy according to the specified parameter.

FIG. 6 comprises an interface 640 for accepting at least one privacy parameter from at least one privacy principal 650. The privacy parameter is associated with an amount of privacy loss that is acceptable to said privacy principal 650. FIG. 6 further comprises a database 600 into which privacy principal's 650 data may be uploaded. A mechanism for determining sensitivity of at least one database query output 620 can comprise, for example, computer readable instructions for determining first information that would be available to an adversary with access to a first database query output, where the first database does not contain data associated with the privacy principal 650. Mechanism 620 may also comprise computer readable instructions for determining second information that would be available to said adversary with access to a second database query output, where the second database contains data associated with the privacy principal 650.

The system of FIG. 6 may further comprise a mechanism for calculating a noise distribution 630 and a mechanism for combining noise with database query outputs 635. Mechanism 635 can select a noise value from the distribution calculated by 630, and combine the selected value with a query output, then pass the noisy output on to interface 640. Mechanism 630 can calculate a noise distribution using a privacy parameter, e.g. a parameter entered by privacy principal 650, and the sensitivity of the database query output as calculated by 620.

Interface 640 may provide a variety of functions, such as receiving a privacy parameter from a privacy principal 650, e.g. through an appropriately configured mechanism such as 641. Demonstrations may be provided by 643 to assist in selecting an appropriate parameter. For example, a demonstration may be given of how to choose a privacy parameter associated with an amount of privacy loss that is acceptable to a privacy principal. A demonstration of an amount of privacy loss associated with a restrictive privacy parameter and an amount of privacy loss associated with an unrestrictive privacy parameter can be instructive.

Interface 640 may also comprise a mechanism such as 642 for releasing noisy outputs to a user interacting with the database 600. As described above, the released noisy output may be computed using a privacy parameter provided by a privacy principal, or provided by an administrator and published through interface 640, or derived from a plurality of privacy principal entries, such as by using a most restrictive privacy parameter selected from a plurality of privacy parameters.

The various mechanisms of FIG. 6 may be implemented via computer readable instructions. For example, mechanism 635 may comprise instructions for preserving privacy of a privacy principal that contributes data to a database. Such instructions can include instructions for combining noise with database 600 query outputs, wherein the noise is selected from a noise distribution provided by 630. The noise distribution is in turn calculated using an output sensitivity calculated by 620 and a privacy parameter.

The various systems and methods discussed herein are contemplated to be carried out by one or more computing devices which are, in general, well understood. A computing device typically includes at least some form of computer readable media. Computer readable media can be any available media that can be accessed by the device. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by a device. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A computer-implemented method for providing data in response to a query on a database containing data pertaining to a plurality of privacy principals while controlling privacy loss of privacy principals, comprising:
    determining first information that would be available to an adversary with access to a first database query output, said first database query output returned in response to said query on said database not containing data associated with an individual privacy principal;
    determining second information that would be available to said adversary with access to a second database query output, said second database query output returned in response to said query on said database containing data associated with the individual privacy principal;
    calculating from a difference between the first information and the second information a differential diameter measurement indicative of the sensitivity of database query output resulting from the query due to addition to the database of data associated with the individual privacy principal;
    receiving a privacy parameter chosen by the individual privacy principal, the privacy parameter corresponding to a level of privacy loss acceptable to the individual privacy principal;
    using the differential diameter measurement and the privacy parameter in generating a distribution of noise values, the differential diameter measurement and the privacy parameter determinative of a width of the distribution of noise values; and
    selecting a noise value from the distribution to combine with results of an actual database query to generate a noisy database query output.

2. The method of claim 1, further comprising adding a noise value from said distribution of noise values to said actual database query output.

3. The method of claim 1, further comprising advertising the privacy parameter and a corresponding amount of privacy loss.

4. The method of claim 1, wherein the distribution is an exponential distribution and the differential diameter measurement and the privacy parameter determine the width of the distribution of noise values.

5. The method of claim 1, further comprising selecting a privacy parameter associated with a minimum amount of privacy loss from a plurality of privacy parameters provided by said plurality of privacy principals.

6. The method of claim 1, wherein the individual privacy principal is a person.

7. A system for interactively controlling privacy loss, comprising:
    a computing processor; and
    computing memory communicatively coupled with the computing processor and having stored thereon computing instructions executable by the computing processor, the computing instructions when executed by the computing processor executing a method for providing data in response to a query on a database containing data pertaining to a plurality of privacy principals while controlling privacy loss of privacy principals, the method comprising:
    determining first information that would be available to an adversary with access to a first database query output, said first database query output returned in response to said query on said database not containing data associated with an individual privacy principal;
    determining second information that would be available to said adversary with access to a second database query output, said second database query output returned in response to said query on said database containing data associated with the individual privacy principal;
    calculating from a difference between the first information and the second information a differential diameter measurement indicative of the sensitivity of database query output resulting from the query due to addition to the database of data associated with the individual privacy principal;
    receiving a privacy parameter chosen by the individual privacy principal, the privacy parameter corresponding to a level of privacy loss acceptable to the individual privacy principal;
    using the differential diameter measurement and the privacy parameter in generating a distribution of noise values, the differential diameter measurement and the privacy parameter determinative of a width of the distribution of noise values; and
    selecting a noise value from the distribution to combine with results of an actual database query to generate a noisy database query output.

8. The system of claim 7, wherein said distribution is calculated using a most restrictive privacy parameter selected from a plurality of privacy parameters.

9. The system of claim 7, the method further comprising releasing a noisy database query output produced by said mechanism for combining.

10. The system of claim 7, the method further comprising providing a demonstration of how to choose a privacy parameter associated with an amount of privacy loss that is acceptable to said privacy principal.

11. The system of claim 7, the method further comprising providing a demonstration of an amount of privacy loss associated with a restrictive privacy parameter and an amount of privacy loss associated with an unrestrictive privacy parameter.

12. The system of claim 7, wherein the distribution is an exponential distribution and the differential diameter measurement and the privacy parameter determine the width of the distribution of noise values.

13. A computer readable storage medium bearing instructions that when executed by a system perform a method for preserving privacy of a privacy principal that contributes data to a database, the method comprising:
    determining first information that would be available to an adversary with access to a first database query output, said first database query output returned in response to said query on said database not containing data associated with an individual privacy principal;
    determining second information that would be available to said adversary with access to a second database query output, said second database query output returned in response to said query on said database containing data associated with the individual privacy principal;
    calculating from a difference between the first information and the second information a differential diameter measurement indicative of the sensitivity of database query output resulting from the query due to addition to the database of data associated with the individual privacy principal;
    receiving a privacy parameter chosen by the individual privacy principal, the privacy parameter corresponding to a level of privacy loss acceptable to the individual privacy principal;

using the differential diameter measurement and the privacy parameter in generating a distribution of noise values, the differential diameter measurement and the privacy parameter determinative of a width of the distribution of noise values; and selecting a noise value from the distribution to combine with results of an actual database query to generate a noisy database query output.

14. The computer readable storage medium of claim 13, wherein the noise distribution is an exponential noise distribution and the differential diameter measurement and the privacy parameter determine the width of the distribution of noise values.

15. The computer readable storage medium of claim 13, the method further comprising receiving the privacy parameter by the privacy principal.

16. The computer readable storage medium of claim 13, the method further comprising selecting a privacy parameter associated with a minimum amount of privacy loss from a plurality of privacy parameters provided by a plurality of privacy principals.

17. The computer readable storage medium of claim 13, the method further comprising calculating said noise distribution.

18. The computer readable storage medium of claim 13, wherein said data associated with said privacy principal comprises data submitted to a government agency.

* * * * *

UNITED STATES PATENT AND TRADEMARK OFFICE
CERTIFICATE OF CORRECTION

PATENT NO.      : 7,698,250 B2                                       Page 1 of 1
APPLICATION NO. : 11/305800
DATED           : April 13, 2010
INVENTOR(S)     : Cynthia Dwork et al.

It is certified that error appears in the above-identified patent and that said Letters Patent is hereby corrected as shown below:

In column 1, line 51, after "11/316,791" insert -- , --.

Signed and Sealed this

Twenty-fifth Day of January, 2011

David J. Kappos
*Director of the United States Patent and Trademark Office*